United States Patent

Chabot et al.

[15] 3,699,856

[45] Oct. 24, 1972

[54] MOVEMENT MONITORING APPARATUS

[72] Inventors: Ronald W. Chabot, Wilmington; George S. Leonard, Billerica; David Sheena, Cambridge, all of Mass.

[73] Assignee: Whittaker Corporation

[22] Filed: April 1, 1970

[21] Appl. No.: 24,537

[52] U.S. Cl. ..................................95/1.1, 346/107
[51] Int. Cl. ...............................................G01d 9/42
[58] Field of Search ....................95/1.1, 36; 346/107

[56] References Cited

UNITED STATES PATENTS 1,199,980   10/1916   Gilbreth ....................346/107
2,420,339   5/1947   Rabinow..................95/36 TC
2,396,280   3/1946   Miller......................346/107

*Primary Examiner*—John M. Horan
*Attorney*—Donald E. Nist

[57] ABSTRACT

Human jaw motion is photographed from the front as well as the side of the face by using a point light source attached to the subject's chin. As the subject moves his jaw a photograph of the light spot tracing is superimposed on a previously taken still picture of the chin. By the use of appropriate mirrors and lenses any one or more of three jaw views may be recorded, namely front, right side, and left side views.

8 Claims, 5 Drawing Figures

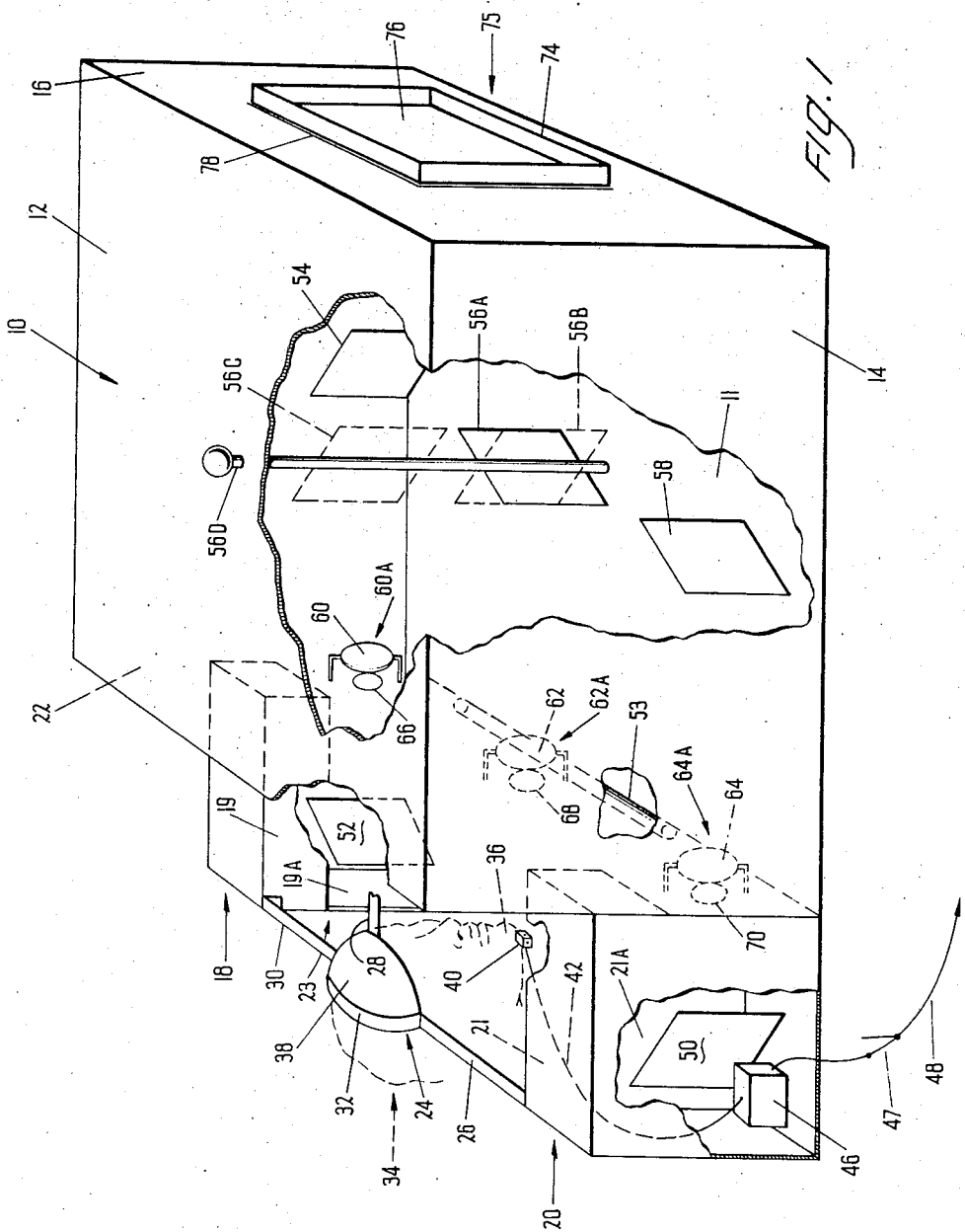

MOVEMENT MONITORING APPARATUS

SUBJECT MATTER AND BACKGROUND OF THE INVENTION

The present invention relates to a method of and apparatus for monitoring the movement of a part of the human body. In a preferred embodiment, the motion of the human jaw is observed by a photographic scheme.

Research in the dental field often requires study of motion of the human jaw to evaluate chewing characteristics. Such research studies for example, are expected to be useful in correlating human behavior traits with observed jaw motion. Such studies are analogous to graphology.

Available instruments that monitor the motion of the human jaw have certain disadvantages including; (1) awkwardness for use on the subject being tested; (2) indirectness in the method of measurement; and (3) difficulty in determining and evaluating the results. For instance, instruments have been built to measure jaw motion by monitoring the change in pressure in the ear canal, or by mechanically linking a stylus to the subject's jaw and graphically recording the motion.

Apparatus constructed according to the present invention photographically records the motion of the jaw. The read-out is not a graph that must be interpreted, but is rather a picture of the human jaw on which is superimposed a reference graticule and a tracing of the jaw movement. With the apparatus of the present invention the method of monitoring the motion of the jaw is direct and easy to interpret and use.

SUMMARY OF THE INVENTION

Accordingly, it is an object of this invention to provide improved apparatus for monitoring the movement of a part of the human body.

A further object of the invention is to provide a method of and apparatus for measuring and recording the motion of the human jaw.

It is a further object of the invention to provide a movement monitoring apparatus according to the preceding objects that is easy and comfortable to use on the subject being tested.

It is another object of the invention to provide a jaw movement monitor characterized by a direct readout that is simple to evaluate.

According to the invention, an apparatus is provided to be coupled to a human for monitoring the movement of at least a part of the body. In one embodiment, the apparatus includes a point source of light affixed to the part, a photo sensitive medium spaced from the point source of light, and a lens and shutter means disposed between the point source and photo sensitive medium. Means are also provided for initially illuminating the part and for initially operating the lens and shutter means during a first time period to form a latent image on the photo sensitive medium of the part when the part is in a stationary position. Finally, means are provided for exposing on the medium for recording thereon the image of the point source of light over a second time period when the part is moving.

Numerous other objects and advantages of the invention should now become apparent upon a reading of the following specification in conjunction with the drawings in which.

BRIEF DESCRIPTION OF THE DRAWINGS

FIG. 1 shows a jaw movement monitor constructed according to the invention.

DETAILED DESCRIPTION

Figure 3A:
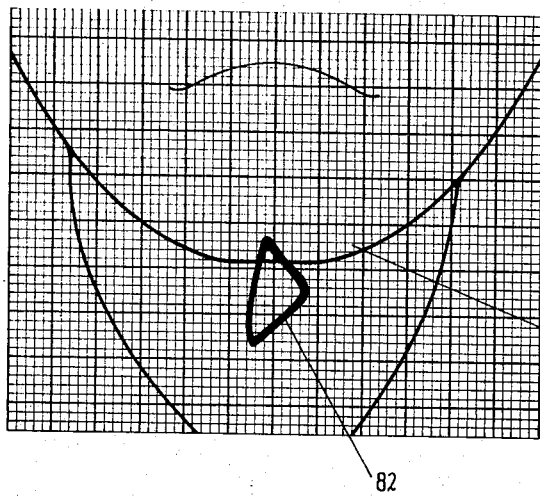
FIGS. 3A, 3B, and 3C show respective front, right side, and left side views of the subject and point source tracing.

FIG. 1 shows a jaw movement monitoring apparatus constructed in accordance with the principles of the present invention. The apparatus includes an enclosed camera housing 10 that generally contains a lens mirror system, a point light source assembly 40 and photo sensitive medium 76. Also shown in FIG. 1 is a means for holding the subject stationary, indicated as head rest 24.

The housing 10 which may be constructed of a plastic or aluminum or equally suitable material includes respective bottom and top walls 11 and 12, side walls 14 and respective back and front walls 16 and 22. Front support housings 18 and 20 extend from front wall 22 and generally define head placement area 23. The support housings 18 and 20 have respective inwardly facing surfaces 19 and 21 which define respective openings 19A and 21A. These openings 19A and 21A provide an unobstructed path from light spot assembly 40 to respective mirrors 50 and 52 contained within housings 18 and 20. Mirrors 50 and 52 are situated at a 45° angle with respect to walls 19 and 21 and are in a fixed position. Fiber optic light source 46 which may be a tungsten lamp, along with AC cord 48 and ON-OFF switch 47 are contained within housing 20 behind mirror 50, as shown.

Figure 2:
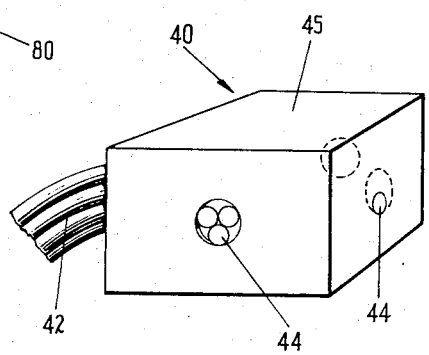
FIG. 2 shows the light spot assembly of FIG. 1 in greater detail.

In FIG. 1 the point source of light is shown as fiber optic light spot assembly 40 attached to chin 36 of the subject. FIG. 2 shows light spot assembly 40 in more detail and includes a light fiber bundle 42 that couples from fiber optic light source 46 to assembly 40. The light spot assembly 40 further includes three separate fiber sources 44 that direct light in three perpendicular directions, namely, to the front, right and left side of the subject's chin. Each fiber source 44 may be a single strand of optic fiber terminated within assembly 40 which is a small 1 cm × 1 cm light-weight fixture. With a small amount of pressure assembly 40 adheres to the subject's chin at top adhesive surface 45.

Alternate embodiment may also be used for the point source of light, all of which are contemplated as falling within the scope of the invention. Among the alternatives are a highly reflecting paste-on dot, a luminescent or fluorescent dot illuminated by long wave ultra-violet radiation, and a solid state light emitter.

To restrain the subject in a stationary position head rest 24 is employed. The head rest includes laterally extending straps 26, 28 and 30 which connect respectively to wall 21 of housing 20, wall 22 of housing 10 and wall 19 of housing 18. Head rest 24 also includes forehead strap 32 which connects over forehead 38 of the subject whose head is generally indicated at 34.

Lenses 60, 62 and 64 are suitably positioned within camera housing 10. A conventional mounting structure for the lenses and other parts may be used. In FIG. 1 respective mounts 60A, 62A and 64A are used extending from wall 22. The lenses have respective iris-type shutters 66, 68 and 70 positioned in front of the lenses. Conventional iris shutters and control for them may be suitably supported in openings in forward wall 22. If desired a tubular member similar to a camera arrangement may commonly support the lens and the shutter in front of it with this member supported in a hole in wall 22. Mirrors 54, 56 and 58 are positioned towards the back wall 16 of camera housing 10 between the lenses and film 76. Mirrors 54 and 58 are fixed at a 45° angle with respect to side walls 14, by conventional means (not shown). Mirror 56 is adapted to move to one of three different positions 56A, 56B and 56C depending upon the particular jaw view that is to be observed. Positions of mirror 56 may be controlled by shaft 56D which extends through top wall 12 and is secured to axis 57. Rotation of shaft 56D permits selection between positions 56A and 56B. Raising shaft 56D permits positioning the mirror in position 56C. Mirrors 50, 52, 54 and 56 and 58 may all be first surface mirrors in order to avoid multiple reflections.

The back wall 16 contains a rectangular opening 75 for accomodating film holder 74, in a conventional manner. A photographic plate may be used instead of the holder 74 in other embodiments. In FIG. 1 film 76 is a 4 × 5 inch film. The graticule 78 has a 1 mm spacings, is mounted in front of the film 76, and appears superimposed on the double exposure for convenience in quantitatively interpreting the results.

By incorporating the appropriate mirrors and lenses the instrument is capable of photographing the right side, or the left side, or the front of the jaw and can measure jaw movement both of the front of the face and to either side of the face. The selection of the desired view is achieved by moving mirror 56 to one of three different positions described.

In operation, the subject assumes a sitting position in front of the instrument and positions his head in head rest 24. This positions him in the correct camera focus without impairing his freedom of jaw movement. Light spot assembly 40 is then affixed to the subject's chin.

To record jaw motion in the plane of the face, mirror 56 is moved up and out of view by pulling shaft 56D. Initially a reference picture is taken with no jaw motion. The subject's chin is illuminated by a standard 6 inch fluorescent lamp 53 which is mounted on the inside of bottom wall 11 in front of the subject. Lamp 53 only remains on during this first exposure time period. Thereafter, a second exposure using the same photo sensitive medium is then taken as the subject moves his jaw without lamp 53 on and the path traced by the chin light spot is recorded on film 76. FIG. 3A indicates the resultant tracing 82 on chin image 80. The optical path is through shutter 68 and lens 62 directly to film 76.

For the embodiment of FIG. 1 the optical system provides about a 2× magnification of the jaw and jaw motion. This easily permits measurement of jaw movement as small as 1–2 mm. The photograph may be taken on a 4 × 5 film format using a typical Polaroid 4 × 5 film holder and black and white ASA 3000 film. The largest movement measured in one embodiment was about 5 cm.

Figure 3B:
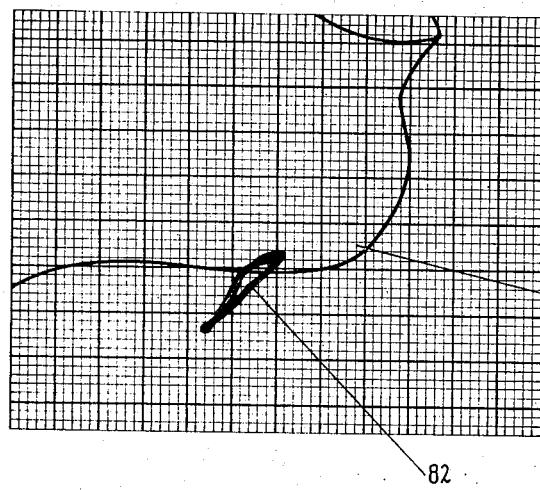
Figure 3C:
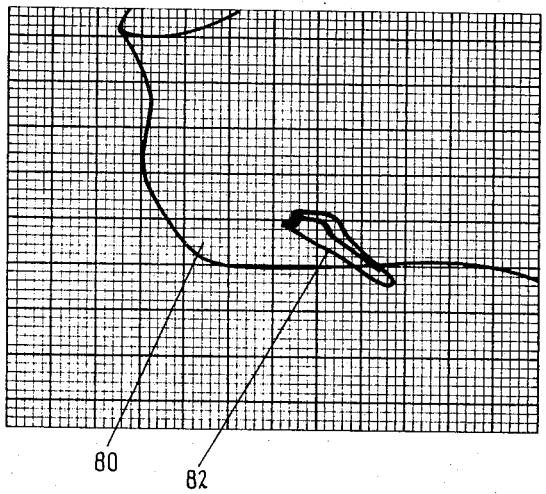

To record jaw motion perpendicular to the plane of the face a side view of the chin is taken following the same general procedure as for the front view. For the right side view, mirror 56 is positioned in position 56A as shown by the solid line in FIG. 1 and the optical path is from light spot assembly 40 to mirror 50, through shutter 70 and lens 64, to mirror 58, to mirror 56 and then to film 76. FIG. 3B shows the resultant tracing. For the left side view mirror 56 is positioned in position 56B as shown by the dotted line in FIG. 1 and the optical path is from light source assembly 40 to mirror 52 through shutter 66, and lens 60, to mirror 54, to mirror 56 and then to film 76. FIG. 3C shows that tracing.

In the embodiment of FIG. 1 mirror 56 pivots about axis 57 at its midsection, as shown. It is apparent that with this arrangement only one side of mirror 56 has to be highly reflective. In an alternate embodiment mirror 56 could rotate about one of its vertical edges thereby requiring a mirror that is highly reflective on both sides.

In one illustrative embodiment of the invention the unit is compact, having overall dimensions of approximately 13 inches by 20 inches by 10 inches. Although black and white film is used it is possible to use color film. The movements of the various elements such as the mirrors and the shutters may be accomplished electromechanically, by using push buttons, for example. In one embodiment of FIG. 1 the movement is considered to occur by hand.

In another embodiment the mirrors 54, 56 and 58 may be removed and a medium or array of three film holders that extends across most of wall 16 may be used. With such an arrangement it is possible to take the front, right, and left side views at one time. This is accomplished by turning on the three fiber sources and associated shutters while the subject moves his jaw. In still another embodiment the three lenses may be replaced by one larger lens and shutter positioned between mirrors 56 and film holder 74.

Having described certain features and advantages of the invention, other modifications of and departures from the invention should become apparent to one skilled in the art, all of which are contemplated as falling within the spirit and scope of this invention, and to be limited solely by the appended claims.

What is claimed is:

1. Apparatus for coupling to a human to monitor the movement of the human's jaw comprising:
    a light source;
    an optic fiber having one end thereof optically coupled to said light source and the other end thereof defining a point source of light, and being adapted to be coupled to the human's chin;
    means for affixing said point source to said chin;
    a photo sensitive medium spaced from said point source of light,
    a lens and shutter means disposed between said point source of light and said photo sensitive medium,
    means for initially illuminating said chin during a first time period, while the chin is stationary, means for initially operating said lens and shutter means during said first time period to form a latent image on said photo-sensitive medium of said chin when in a stationary position,
    means for multiple exposing said medium for recording on said medium the image of said point source of light over a second time period when said jaw is moving.

2. The apparatus as set forth in claim 1 further characterized by at least three optic fibers being optically coupled to said light source and adapted to be coupled to said chin to define at least three point sources of light therein and adapted to direct a light beam from the front, right and left side of said chain.

3. Apparatus as set forth in claim 2 comprising at least three lenses and at least three shutters and first and second mirrors located respectively to the right and left sides of said chin, said front directed point source of light adapted to direct light by way of said one lens and shutter combination to said photosensitive medium, said right directed point source of light adapted to direct light by way of said first mirror and said second lens and shutter combination to said photo sensitive medium, and said left directed point source of light adapted to direct light by way of said second mirror and said third lens and shutter combination to said photo sensitive medium.

4. Apparatus as set forth in claim 3 wherein said first and second mirrors are each arranged in an upright position and positioned at about 45° from the perpendicular to a plane generally coplanar with the face of said subject.

5. Apparatus as set forth in claim 4 comprising a first reflective means coupled between said second lens and shutter combination and said photo sensitive medium and a second reflective means coupled between said third lens and shutter combination and said photo sensitive medium, said first and second reflective means adapted to direct light from said respective right and left directed point sources of light to said photo sensitive medium.

6. Apparatus as set forth in claim 5 wherein said first and second reflective means include a common rotatable mirror located intermediate a reflective mirror of said first reflective means and a complementarily arranged reflective mirror of said second reflective means.

7. Apparatus as set forth in claim 6 wherein said first and second reflective mirrors are each arranged in an upright position and positioned at about 90° with respect to each other and about 45° from said perpendicular to a plane.

8. Apparatus as set forth in claim 7 wherein said common mirror is rotatable so to be parallel to said first reflective mirror when viewing said right side and parallel to said second reflective mirror when viewing said left side.

* * * * *